(12) United States Patent
Shubert et al.

(10) Patent No.: US 9,090,196 B2
(45) Date of Patent: Jul. 28, 2015

(54) CONTINUOUS SEDIMENT REMOVAL APPARATUS AND METHOD

(71) Applicant: Trecan Combustion Limited, Nova Scotia (CA)

(72) Inventors: Joseph Neil Shubert, Nova Scotia (CA); David Gerald Regan, Nova Scotia (CA); Randy Scott Jollimore, Nova Scotia (CA)

(73) Assignee: TRECAN COMBUSTION LIMITED, Nova Scotia (CA)

( * ) Notice: Subject to any disclaimer, the term of this patent is extended or adjusted under 35 U.S.C. 154(b) by 222 days.

(21) Appl. No.: 13/713,700

(22) Filed: Dec. 13, 2012

(65) Prior Publication Data

US 2013/0170933 A1 Jul. 4, 2013

(30) Foreign Application Priority Data

Dec. 13, 2011 (CA) .................................... 2761922

(51) Int. Cl.
*B65G 53/46* (2006.01)
*B60P 3/22* (2006.01)

(52) U.S. Cl.
CPC .................................... *B60P 3/2245* (2013.01)

(58) Field of Classification Search
USPC .................... 210/159; 406/68, 106, 135, 154; 414/507; 37/228
See application file for complete search history.

(56) References Cited

U.S. PATENT DOCUMENTS

| | | | | |
|---|---|---|---|---|
| 1,180,564 A | * | 4/1916 | Burnard | 210/158 |
| 1,992,005 A | * | 2/1935 | Goldsborough | 210/158 |
| 3,018,893 A | * | 1/1962 | Collie et al. | 210/159 |
| 3,409,006 A | | 11/1968 | Getti | |
| 3,891,558 A | | 6/1975 | Condit, Jr. | |
| 4,042,506 A | | 8/1977 | Wilson | |
| 4,214,988 A | | 7/1980 | Naffziger | |
| 4,277,339 A | * | 7/1981 | Quin | 210/413 |
| 4,289,619 A | * | 9/1981 | Sampson | 210/159 |
| 4,836,919 A | * | 6/1989 | Huber | 210/158 |
| 5,110,461 A | * | 5/1992 | Abel | 210/158 |
| 5,118,414 A | * | 6/1992 | Byers | 210/158 |
| 5,171,436 A | * | 12/1992 | Botsch | 210/159 |
| 5,787,613 A | * | 8/1998 | Derome | 37/228 |
| 5,791,335 A | | 8/1998 | Luciani | |
| 5,868,256 A | * | 2/1999 | Teppo | 209/173 |
| 6,736,129 B1 | | 5/2004 | Smith | |
| 7,344,637 B2 | * | 3/2008 | Frommann | 210/158 |
| 7,771,589 B2 | * | 8/2010 | Kelly et al. | 210/104 |
| 2002/0139734 A1 | * | 10/2002 | Hur | 210/159 |
| 2007/0181471 A1 | * | 8/2007 | Grimmel | 210/106 |

FOREIGN PATENT DOCUMENTS

WO WO 2009/105775 8/2009

* cited by examiner

*Primary Examiner* — Joseph Dillon, Jr.
(74) *Attorney, Agent, or Firm* — Jacobson Holman, PLLC.

(57) ABSTRACT

A snow melting vehicle includes a receptacle for receiving a snow load to be melted inside the receptacle into meltwater and a debris collecting system for moving the debris fallen to the bottom of the receptacle into a collecting chamber disposed adjacent the receptacle. A debris lifting system is also provided for raising the debris from the collecting chamber to a position above the meltwater filling the collecting chamber, whereby the meltwater is substantially drained before the debris is gravity discharged outside the snow melting vehicle.

16 Claims, 3 Drawing Sheets

CONTINUOUS SEDIMENT REMOVAL APPARATUS AND METHOD

This application has a priority of Canadian no. 2,761,922 filed Dec. 13, 2011, hereby incorporated by reference.

FIELD OF THE INVENTION

The invention relates generally to continuous sediment removal systems and methods and more particularly to a continuous sediment removal apparatus and method for removing aggregate from a receptacle or melting tank of a snow melting vehicle.

BACKGROUND OF THE INVENTION

Snow melting vehicles are known in the art and are used to dispose of large amounts of snow by melting the snow and discharging the meltwater, usually into storm drains. The conventional devices typically have a large receptacle or melting tank for receiving the snow and various systems for melting the snow, including water spray devices, grinding devices and heating-type devices which melt the snow.

It is known that the snow load can include aggregate, such as, for example, sand, gravel, stones, plastics of many shapes and sizes and various heavy metallic objects, which are inadvertently collected along with the snow. This is particularly a problem in big cities where any clogging of the sewers is undesirable and should be avoided.

In conventional snow melting systems, the entire system must be shut down and the water drained out of the snow receptacle or melting tank in order to gain access to and remove the various debris collected with the snow which accumulate in the snow melting tank during operation.

Accordingly, there is a need for a continuous system and process for removing aggregate from the receptacle or melting tank of a snow melting vehicle in order to ensure continuous operation thereof. This is desirable to avoid any disruptions during the snow melting operation of the vehicle, which will result in energy savings and increased efficiency.

SUMMARY OF THE INVENTION

It is, therefore, an aspect of the present invention to provide a continuous sediment removal apparatus and method for removing aggregate from a receptacle or melting tank of a snow melting vehicle.

One embodiment of the present invention will be a sediment removal apparatus for a snow melting vehicle having a receptacle for receiving a snow load to be transformed inside the receptacle into meltwater, the apparatus including a debris collecting system for displacing debris fallen to a bottom of the receptacle into a collecting chamber disposed adjacent the receptacle and a debris lifting system for raising the debris from the collecting chamber to a position above for gravity discharging the debris outside the collecting chamber.

The debris collecting system preferably includes a means for creating a water flow loop on the bottom platform of the receptacle for displacing the debris from the bottom of the snow receptacle into the collecting chamber. In a preferred embodiment, the water flow loop may be directed inside a channel disposed on the bottom platform. The debris are directed inside the channel and collected and pushed by the water flow toward and into the collecting chamber. In one particular embodiment, the bottom of the receptacle is inclined toward the channel for directing the debris inside the channel. For example, the inclination of the bottom of the receptacle may be about 15°.

The debris lifting system preferably includes a rotatable circular frame having a plurality of paddles or blades for lifting the debris above the water line in the collecting chamber. The collecting chamber may have a concave bottom wall and side walls dimensioned to facilitate the debris lifting action of the debris lifting system. Preferably, the debris can be discharged outside the collecting chamber via a discharge chute.

A snow melting vehicle includes the sediment removal apparatus according to the invention. In a preferred embodiment, a snow melting apparatus can be retrofitted with the sediment removal apparatus of the invention so as to maximize its continuous operation and enhance its feasibility.

BRIEF DESCRIPTION OF THE DRAWINGS

The present invention will be further understood from the following detailed description of preferred embodiments of the invention, having regard to the accompanying drawings, in which.

DETAILED DESCRIPTION OF THE INVENTION

Reference will now be made in detail to the present preferred embodiments of the invention, an example of which is illustrated in the accompanying drawings. Wherever possible, the same reference numbers will be used throughout the drawings to refer to the same or like parts.

Figure 1:
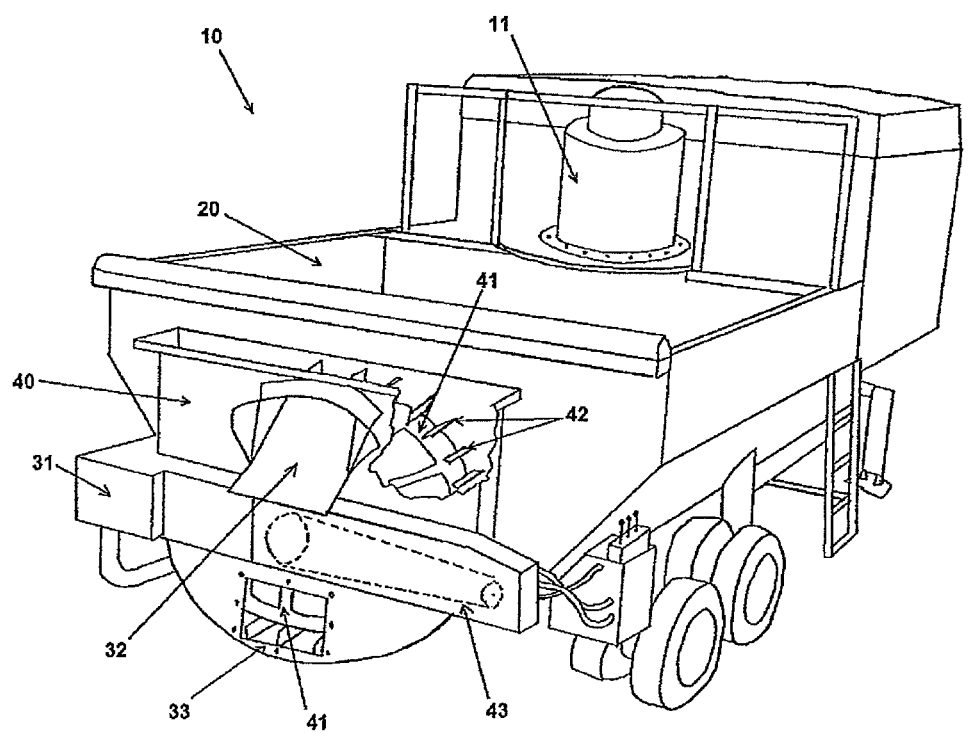
FIG. 1 is a perspective view of a snow melting vehicle including a sediment removal system according to an embodiment of the present invention.
Figure 2:
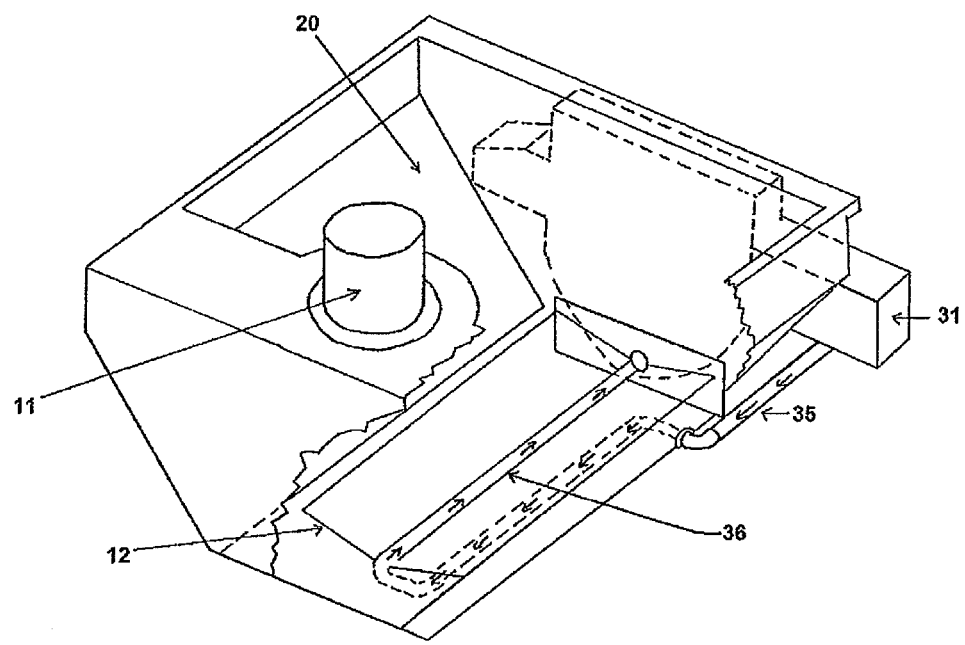
FIG. 2 is a view of a receptacle of a snow melting vehicle including the debris collecting system according to an embodiment of the invention.
Figure 3:
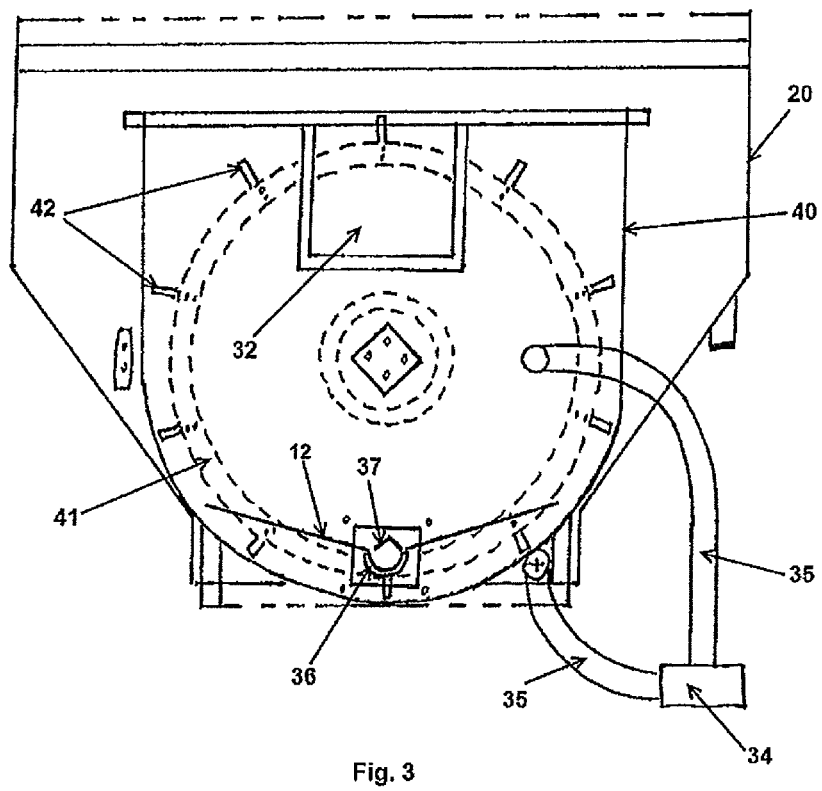
FIG. 3 is a plan view of a sediment removal system according to an embodiment of the present invention.
Figure 4:
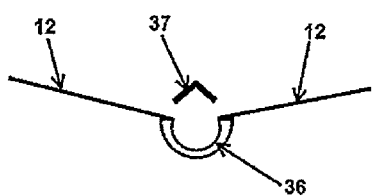
FIG. 4 is a cross-sectional view of a floor of a receptacle including a channel and a spaced apart angled cover top according to an embodiment of the present invention.

An exemplary embodiment of the continuous sediment removal system for a snow melting vehicle is shown in FIG. 1 and is designated generally by reference numeral 10.

As embodied and illustrated herein, a sediment removal apparatus for use with a snow melting vehicle 10 having a tank or receptacle 20 includes a debris collecting system and a debris lifting system. The debris collecting system moves the debris introduced into the tank 20 with the snow load and fallen on the bottom platform 12 of the tank 20 by means of a water flow into a collecting chamber 40 adjacent the tank 20. The collecting chamber 40 houses the debris lifting system.

According to an aspect of the invention, the continuous removal apparatus is purposed to efficiently and continuously remove aggregate (size less than 40 mm), such as, eg. sand, rocks and other heavy small debris, from a meltwater slurry within the tank 20, for obtaining a separation of the water and aggregate and allowing only a small quantity of the water to escape. This would be applicable to a situation where the water and debris are being dumped in continuously or randomly and will avoid the necessity to shut down the melting process and completely drain the water from the tank 20 in order to remove the debris from the tank 20.

One of the main difficulties encountered in conventional snow melting systems is the jamming and wear on moving mechanical parts caused by the varied aggregate that must be removed. In accordance with the present invention, this can be addressed, inter alia, by using a water flow and resilient blades or paddles to apply force to remove the debris as opposed to steel parts pushing and lifting the debris.

According to an embodiment of the present invention, there is provided a water flow loop that continuously cycles the water through the water/debris tank 20 using a pump 34, preferably housed in a pump chamber 31, that is external to the tank 20. Preferably, the water flow through the tank 20 runs in a partially open top trough or channel 36 disposed on the bottom platform 12 of the tank 20. Preferably the bottom platform 12 is slanted for gravity directing the debris into the trough 36.

According to the invention, the debris are caused by gravity to slide down the slanted floor 12 and get pushed by the water flow out the end of the tank 20 into the debris collecting chamber 40. Depending upon the amount of turbulence in the tank and the type of aggregate, the angle of the platform 12 required to cause the debris to slide down can vary. Preferably, in accordance with one embodiment of the invention, the angle of the bottom platform 12 of the tank 20 can be about 15° so as to ensure operation of the invention with sand, crusher dust and gravel up to ½" and rocks up to 1". However different angles can be envisaged and operable as dictated by the nature of the debris material and water turbulence conditions in the tank 20.

A few factors can be considered in determining the required pump 34 size to ensure the water flow is strong enough to move the debris dropped in the trough or channel 36. It is understood that the water pump 34 is connected to the tank via pipes 35, and can essentially cause a suction force at one end of the tank and a positive flow at the other end, and, as such, there can be little concern in moving the debris near those locations. However, the area in the middle of the tank 20 can lose a considerable amount of water flow force, due to, in part, the flow water mixing with the water in the tank. Therefore, it can be concluded, that the length of the tank 20 and the water speed are directly related for proper operation of the present invention. For example, in an embodiment of the present invention, a channel 36 can have a length of about 10 feet and the opening area at the end of the tank for the water to flow can be approximately 13 square inches. A water flow speed of between about 400 and 550 feet per minute can be used to ensure that there is enough force in the middle of the tank 20 to move the debris.

With water entering the tank 20 in a 4" pipe and then being exposed to the ambient water, with the open top on the trough 36 the water can very quickly mix with the stationary water and lose its velocity. In a preferred embodiment, in order to keep most of this velocity a top 37 can be positioned on this trough 36 which will help it to hold the water velocity longer in the tank. This top 37 can be positioned with a 1" gap between it and the trough on both sides to allow debris up to 1" smallest dimension to fall inside the trough or channel 36. In accordance with another preferred embodiment, in order to ensure good water flow in the middle, the trough cross section can be divided so that there is a lower or distal section that can be fully covered (and therefore does not mix with the tank water) to the middle section of the tank and then the proximal section can be uncovered and mixed with the slower water in the main section of the trough.

In case of oversized debris, such as, for example anything larger than 1" in accordance with a preferred, but not limited to, embodiment of the present invention, an open mesh (not shown) may be positioned over the trough area to catch the debris and prevent it from falling into the trough. If there can be large amounts of large objects that may be collected this can quickly block the openings in the mesh and therefore prevent the other debris from falling into the trough. The surface area of this mesh will have to be increased by raising it and/or adding multiple levels and an easy method of lifting and removing the mesh for cleaning.

According to one mode of operation of the invention, after the water flow displaces the debris from the channel or trough 36 outside the main tank 20 into the collecting chamber 40, the debris can be discharged outside the collecting chamber 40. The collecting chamber can be provided with an effective method of removing the debris, according to the embodiments described hereinbelow.

According to one embodiment of the present invention, the collecting chamber 40 can be fully sealed. The collecting chamber can also have a volume and shape adapted to cause a significant slowing of the water flow to allow the debris to settle onto the bottom of the chamber. According to this embodiment, the water flow exit can be positioned at the top corner of the chamber in order to prevent the debris being sucked out of the chamber. In this embodiment, the chamber can have an isolating valve at the entrance and exit of the chamber. To determine when the chamber is filled enough to require cleaning a debris sensing level switch or a weight measurement apparatus and method can be used.

In order to remove the debris from the chamber the two isolating valves will have to be closed and the water pump should be turned off. This will prevent significant loss of primary chamber water. The chamber can then be opened and dumped with a small loss of water and also a small amount of down time if the opening method is automated.

According to another embodiment of the present invention, the secondary chamber 40 can include a spinning rotor frame 41 with wiper blades 42, the blades being preferably made of a resilient material, such as rubber or polycarbonate. The spinning rotor frame 41 can be rotated via a drive chain 43, for example. In one method of operation, the debris entering the collecting chamber 40 can be swept sideways and lifted by the blades 42 of the spinning wheel 41. As illustrated and embodied herein, the wheel 41 raises the debris in an arc until it reaches the water surface. At this point any amount of water held on the wiper starts to flow off. Operation of the wheel 41 at a predetermined speed can allow a significant amount of the water to drain from the blades 42 before it nears the tops center location. A discharge chute can be conveniently provided in the top center area directly under so that the debris can be, thus, gravity discharged outside the collecting chamber. According to an embodiment of the invention, the debris can slide down the discharge chute and can be collected with a very low water concentration.

The wheel 41 turn rate can be adapted and operated based on the quantity of debris that is being removed and on the number of wiper blades 42, in order to ensure that debris removal does not bring a large amount of water with it. In one embodiment of the invention, the wheel 41 can include twenty (20) paddles or blades 42. For example, a rotor speed can be between about 5 and 7 rpm. As explained above, it can be appreciated that the rotor speed can vary depending on the debris concentration in the water.

For example, the blades 42 can be made of 60 Durameter™ neoprene with a view to lasting for a very long time while also still being quite cheap to replace. In one exemplary application of the invention, where a goal was to remove as little water as possible, a 1" gap between the sides of the rubber blades and the walls of the secondary chamber casing can be provided so as to allow the water to pour out quicker as the blade 42 moves above the water line and prevent any jam of debris between the rotor structure and the chamber wall.

As embodied herein, an aspect of the present invention is the reduction of the amount of debris sucked through the pump 34. As known in the art, debris going through a pump over time will cause erosion and wear the impeller and the pump casing down so that it will need to be replaced.

In order to mitigate the possible erosion of the pump, as illustrated and embodied herein the suction intake from the collecting chamber 40 to the pump 34 via pipe 35 can preferably be as close as practical to the top of the chamber or the water surface without, however, sucking air into the pump and the intake size should be larger to reduce effective suction pressure/area and reduce the forces pulling on the debris. Another preferred embodiment can use a screen to block the debris while having a large enough surface area so as to minimize that the screen can be blocked with debris by virtue of the suction force of the pump 34. Moreover, as known in the art, cycling the pump backwards periodically can help to remove and debris from the screen.

Variations, adaptations, and modification to the above described preferred embodiments of the invention are possible without departing from the scope and content of the invention, as described in the claims appended hereto.

LIST OF REFERENCE CHARACTERS

10—snow melting vehicle
11—burner
12—tank bottom platform
20—melting tank
31—pump chamber
32—discharge chute
33—access area
34—pump
35—pipe
36—channel
37—angled cover top
40—collecting chamber
41—wheel
42—blades
43—drive chain The embodiments of the present invention in which an exclusive property or privilege is claimed are defined as follows:

1. A sediment removal apparatus for a snow melting vehicle having a snow receptacle for receiving a snow load to be transformed inside the receptacle into meltwater, the apparatus comprising:
a debris collecting system including a separate collecting chamber adjacent to and in fluid communication with the snow receptacle, and a mechanism for displacing the debris from the bottom of the snow receptacle into the collecting chamber; and
a debris lifting and discharging system including a rotatable circular frame having a plurality of paddles or blades extending radially outwardly from said frame and rotatable therewith, the frame and paddles rotatably located inside the collecting chamber and movable both above and below a water line in said collecting chamber, debris entering the collecting chamber being swept sideways and lifted by the rotating paddles to raise the debris in an arc until the debris reaches the water line and then lifting the debris above the water line for discharge outside of the snow melting vehicle.

2. The apparatus according to claim 1, wherein the debris collecting system includes a channel on the bottom of the snow receptacle for receiving the debris.

3. The apparatus according to claim 2, wherein the bottom of the receptacle is inclined toward the channel for directing the debris inside the channel.

4. The apparatus according to claim 2, wherein the mechanism for displacing the debris is a pump for injecting water into the channel at a predetermined water flow.

5. The apparatus according to claim 4, wherein the predetermined water flow is between about 400 and 550 cubic feet per minute for a channel having a length of about 10 feet.

6. The apparatus according to claim 2, wherein a spaced apart elongated angled top wall extends the length of the channel for directing the flow of water into the channel and for facilitating the displacement of the debris into the collecting chamber.

7. The apparatus according to claim 2, wherein a portion of the channel distal to a point at which the channel is connected to the collecting chamber has a top cover for directing the flow of water into the channel and for facilitating the displacement of the debris which accumulate into a proximal portion of the channel into the collecting chamber.

8. The apparatus according to claim 1, wherein the rotatable circular frame has 20 paddles or blades and rotates at approximately between 5 and 7 rpm.

9. The apparatus according to claim 8, wherein the paddles or blades are made of natural or synthetic rubber, polycarbonate, or plastic.

10. The apparatus according to claim 1, wherein the collecting chamber has a concave bottom wall and side walls dimensioned to facilitate the debris discharging action of the debris lifting and discharging system.

11. The apparatus according to claim 3, wherein a degree of inclination of the bottom of the receptacle is about 15°.

12. The apparatus according to claim 1, wherein the collecting chamber includes a discharge chute for gravity discharging of the debris lifted above the water line outside the collecting chamber.

13. The apparatus according to claim 1 in combination with and operable with a snow melting vehicle.

14. The apparatus according to claim 4, wherein the pump recirculates water from the collecting chamber to the channel in the snow receptacle.

15. The apparatus according to claim 14, wherein the pump is connected to an upper portion of the collecting chamber.

16. The apparatus according to claim 1, wherein the rotatable circular frame is substantially upright.

* * * * *